United States Patent [19]

Ioannou

[11] 3,873,770

[45] Mar. 25, 1975

[54] DIGITAL POSITION MEASUREMENT SYSTEM WITH STYLUS TILT ERROR COMPENSATION

[75] Inventor: John T. Ioannou, Livonia, Mich.

[73] Assignee: The Bendix Corporation, Southfield, Mich.

[22] Filed: Mar. 21, 1974

[21] Appl. No.: 453,660

[52] U.S. Cl. .................................................. 178/18
[51] Int. Cl. ............................................. G08c 21/00
[58] Field of Search ............ 340/347 AD, 146.3 SY; 178/18, 19, 20; 346/139 C

[56] References Cited

UNITED STATES PATENTS

| | | | |
|---|---|---|---|
| 3,535,447 | 10/1970 | Wollrich | 178/18 |
| 3,668,313 | 6/1972 | Dym | 178/19 |
| 3,700,809 | 10/1972 | Nadon | 178/18 |
| 3,710,362 | 1/1973 | Manzo et al. | 340/146.3 SY |
| 3,732,369 | 5/1973 | Cotter | 178/18 |

*Primary Examiner*—Thomas A. Robinson
*Attorney, Agent, or Firm*—Lester L. Hallacher

[57] ABSTRACT

A system for digitizing graphic data from a worksheet by tracing out or pointing to curves and points on the worksheet with a stylus. A tablet having a surface to receive the worksheet includes a conductor grid defining two perpendicular axes of measurement. The conductors are sequentially excited and a coil in the stylus picks up an impulse having an envelope which shows positive and negative peaks spaced by a distance $2h$, where $h$ is coil height above the grid plane measured along the stylus axis. The conductor grid planes are physically displaced from the tablet surface by some small but finite distance thus giving rise to an apparent position error if the stylus is tilted during use; i.e., the indicated position will be the projected intersection of the stylus axis with the grid plane, not the surface. Means are provided for detecting stylus tilt and variations in $h$ and to compensate for position errors.

5 Claims, 6 Drawing Figures

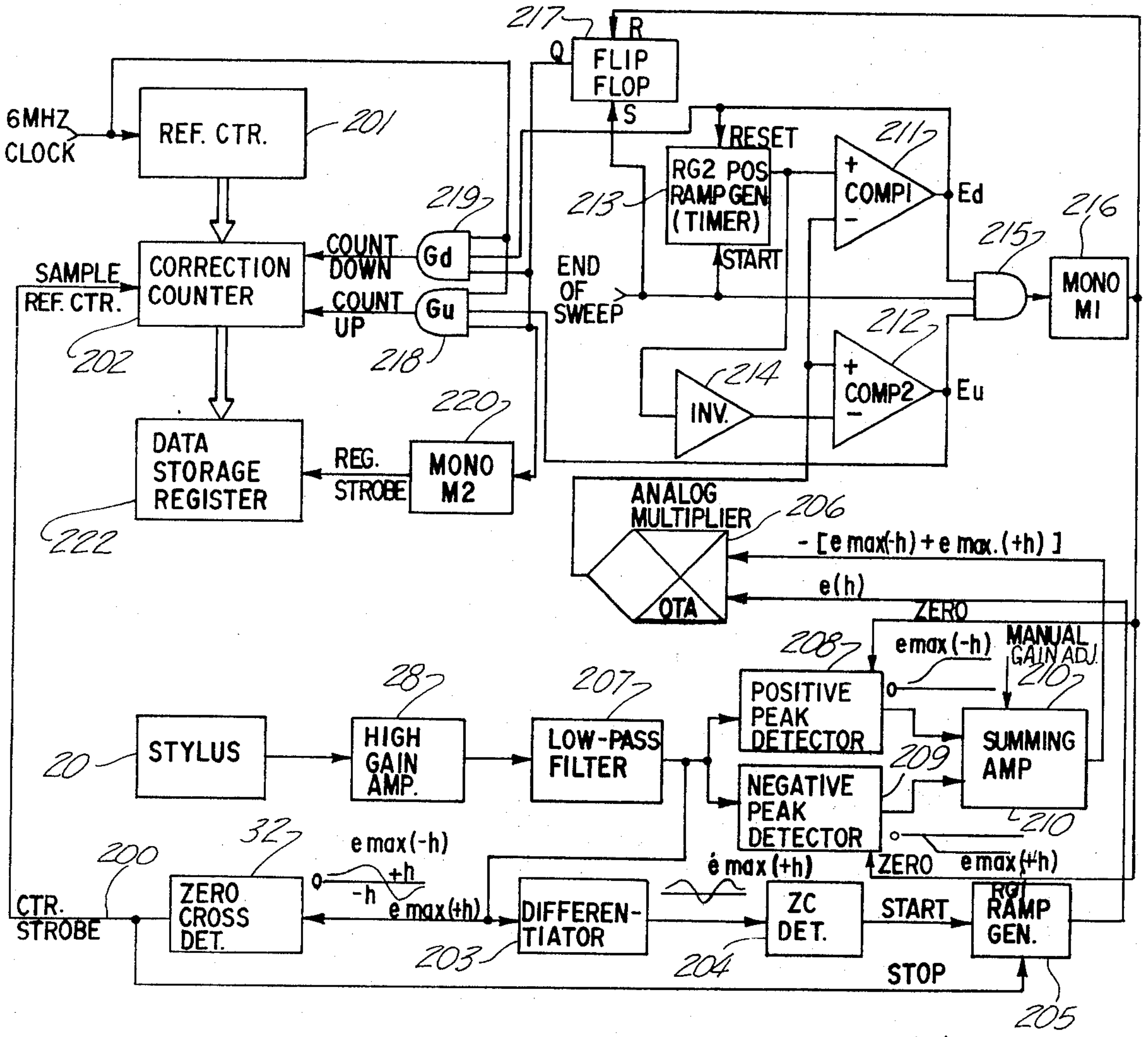
Fig-5
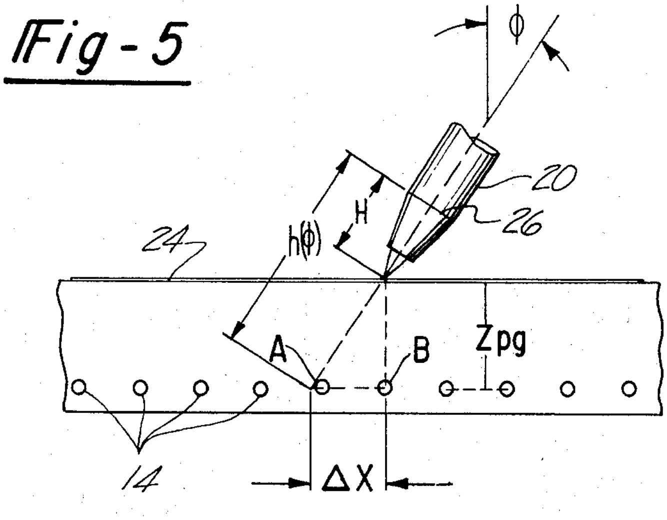
Fig-6
| TRUTH TABLE | | |
|---|---|---|
| [em(-h)+em(+h)] | Ed | Eu |
| + | 0→1 | 1 |
| − | 1 | 0→1 |
| 0 | 1 | 1 |
Fig-5a

DIGITAL POSITION MEASUREMENT SYSTEM WITH STYLUS TILT ERROR COMPENSATION

INTRODUCTION

This invention relates to a system for precisely determining the position of a stylus on a tablet including a grid of current-excited conductors and more particularly to a system which includes compensation for position errors which can arise when the stylus axis is tilted and the stylus end point is not coplanar with the excited conductor grid.

BACKGROUND OF THE INVENTION

Systems for recording points and curves on a work sheet by monitoring the position of a pointer or similar movable device on a work surface are known in the prior art and, in general, comprise (a) a rigid structure defining a two-dimensional work sheet support surface, such structure being commonly called a "tablet," and (b) a pointer device which is positionable over and in contact with a work sheet on the surface. The system further typically comprises a conductor grid in the work surface structure and some instrumentality to provide an electrical coupling between the conductor grid and the pointer so that contacting the surface structure with the pointer transfers an electrical signal quantity between the pointer and grid. From this signal quantity, the particular position of the pointer within the grid is determined using one of several available techniques. Thus, an operator may place a drawing or the like of the work surface and generate and store data representing points or lines on the drawing simply by tracing out the points or lines with the pointer.

One of the problems associated with the use of a free, pen-type stylus carrying an electromagnetic coil-type pickup arises from the fact that few persons normally hold such a device in a purely vertical orientation; i.e., most persons hold a pen or pencil at some angle relative to the worksheet. In a measurement system where the plane of the conductor grid and the plane over which the stylus end point traces are one and the same, stylus tilt error can be readily overcome. A system which accomplishes stylus tilt insensitivity is described in the copending application for patent, Ser. No. 453,659, filed concurrently herewith and entitled ABSOLUTE POSITION DETERMINING SYSTEM USING FREE STYLUS. Stylus tilt, however, can still produce position errors if the construction of the tablet, the thickness of the worksheet, or some other physical factor or a combination of such factors causes a significant displacement beteween the stylus end point and the current-excited grid plane. Under these circumstances, the stylus point may be at one point on the tablet surface, but, due to stylus tilt, the position reading will correspond to the projection of the stylus axis to the grid plane. Clearly, large tilt angles and large stylus point displacements can give rise to intolerable errors.

BRIEF DESCRIPTION OF THE PRESENT INVENTION

The present invention has for its principal objective the provision of a position measuring system having a tablet and a free, pen or pencil type stylus wherein the accuracy of the position data is extremely high irrespective of stylus tilt and effective stylus end point displacements due to work sheet thickness variations, tablet construction and other factors. In general, this is accomplished by the provision of a tablet having, for each axis, a plurality of spaced, parallel conductors parallel to but displaced from the work surface of the tablet, means for producing successive sequential pulse excitation of the conductors means including a stylus pickup for producing a signal quantity representing the position of the stylus on the tablet as a function of the time of passage of a pulse wave through the position of the stylus end, and means for compensating the signal quantity as necessary to account for a projection error along the axis or axes of measurements. As hereinafter explained, the stylus pickup of the illustrated embodiment comprises a coil which is disposed at a height $h$ above the conductor plane measured along the stylus axis. Energization of the conductors in sequence produces a coil impulse voltage envelope which rises to a first peak which corresponds to the energization of the first conductor which lies within a distance $h$ from the stylus end taken along the grid plane. The envelope then passes through a polarity change to a second peak of opposite polarity as the last conductor a distance $h$ from the stylus end but on the other side thereof is excited. The position is determined by determining the time, measured from the beginning of the conductor excitation sequence, the envelope passes through a reference value, such as zero, between the two peaks. The quantity $h$, however, is a variable function of stylus tilt, hereinafter defined by the angular character $\phi$.

In the preferred embodiment of the invention hereinafter described in greater detail, high position resolution in the digital position count is provided by means of the combination of a source of high frequency signals, a uniform number of which occur between successive lower frequency signals, means for applying the lower frequency signals to the tablet in such a way as to initiate the sequential pulse excitation of the conductors at least once for each such signal, counter means for keeping track of the number of high frequency signals, pickup means including a portion carried by the stylus for producing an output signal as the polarities of the pickup signal voltages reverse; i.e., the pickup signal amplitude passes between positive and negative peaks, and means connecting the output signal from the stylus to a counter which receives a number proportional or equal to the number of high frequency signals which have occurred prior to the zero crossing. Accordingly, this number is a representation of the absolute position of the stylus on the work surface of the table. The count is a digital indication of stylus position along one axis and is of such a character as to be readily converted to a suitable form for computer storage and/or display.

A principal feature of the invention is the provision of compensation for grid thickness changes and the effect thereof on stylus tilt error. In general, this is accomplished by determining the value of $h$ for a given tilt angle and compensating the position signal quantity by an error correction quantity ($\Delta X$ for the X-axis of measurement) which corresponds to that value of $h$. The geometric and mathematical relations for such determinations are hereinafter described in detail.

The compensation feature of the subject invention may be implemented in various ways including automatic and semi-automatic systems. A preferred approach is to determine the stylus end point displacement from a comparison between a calibrated voltage value and an impulse envelope peak voltage +e max measured with the stylus held in a substantially upright position. Another feature of the preferred embodiment is the use of a correction counter which can generate positive and negative correction quantities to compensate for both forward and reverse stylus tilt angles along the measurement axis.

Various additional features and advantages of the present invention will be apparent from the following detailed description of an illustrative embodiment of the invention, This description is to be taken in conjunction with the accompanying drawings, a brief description of which follows.

BRIEF DESCRIPTION OF THE DRAWINGS

FIGS. 5 and 5A are schematic circuit diagrams of a grid thickness compensation system embodying the invention; and FIG. 6 is a diagram showing the effect of grid thickness on stylus tilt error.

DETAILED DESCRIPTION OF THE SPECIFIC EMBODIMENT

Figures 1, 2:
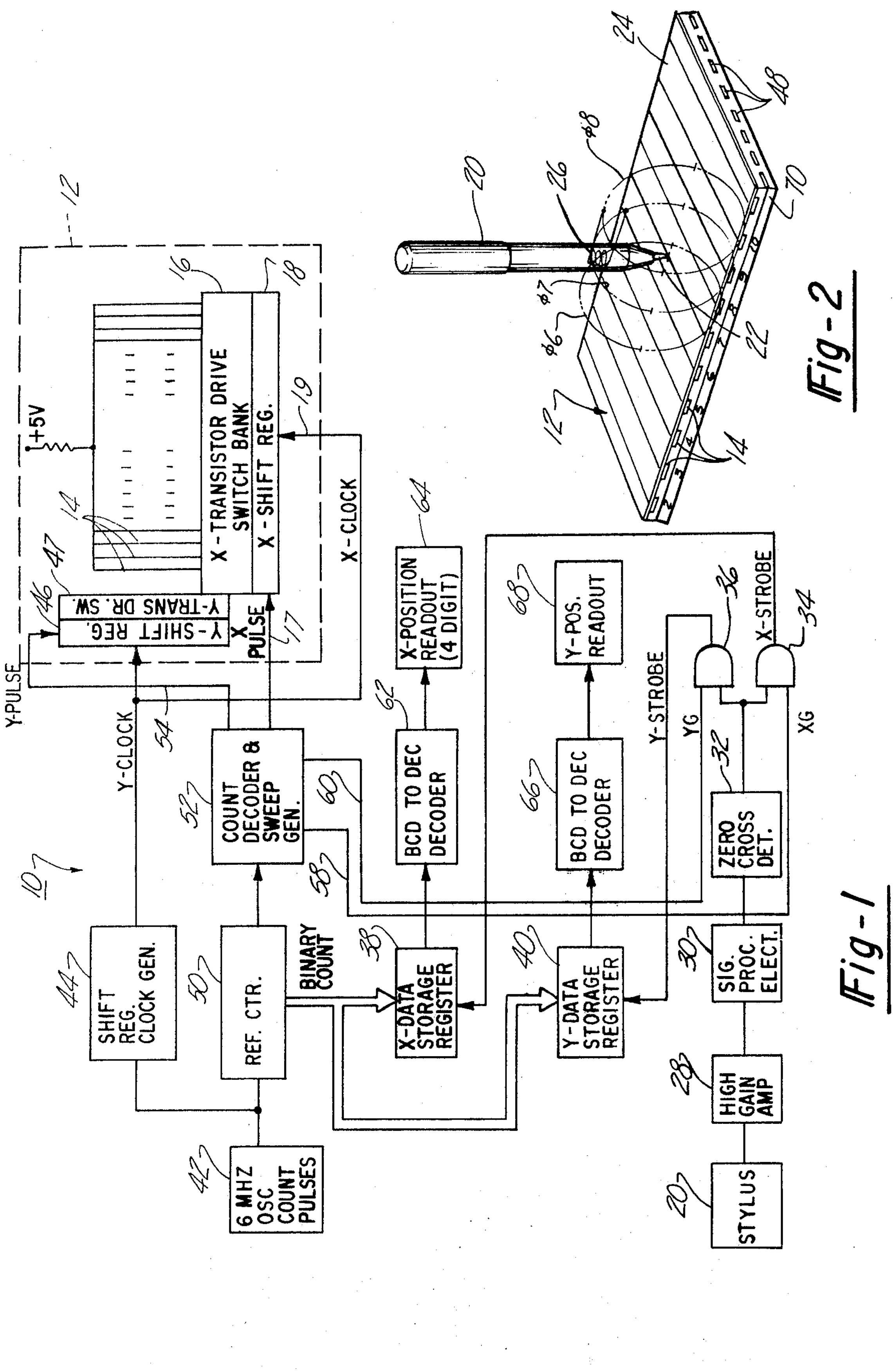
FIG. 1 is a block diagram of a stylus position measurement system embodying the present invention.
FIG. 2 is a cross sectional view in perspective of a tablet constructed in accordance with the invention, a stylus disposed at a certain position on the tablet, and an indication of the flux pattern for a single axis relative to the stylus pickup coil.

FIGS. 1 and 2 — General System Description

Referring to FIGS. 1 and 2, the present invention is shown embodied in a two-axis absolute digital position measurement system 10 comprising a tablet 12 and a free, pen-type stylus 20. The term "free" as used herein means hand-held and unconstrained by mechanical linkages. The tablet 12 is constructed as illustrated in FIG. 2 to provide a flat, rigid work surface 24 adapted to receive a work sheet, such as a drawing or map. Tablet 12 comprises a portion of the position measurement electronics including a plurality of spaced parallel conductors 14 substantially coextensive with the work surface 24, the conductors being distributed or spaced along a horizontal axis in FIG. I also designated the X-axis. A similar set of conductors 48 define the Y-axis of measurement. A transistor drive switch bank 16 is provided for controlling the flow of excitation current through the conductors 14 in a sequence determined by a shift register 18. The rate of the energization pulse propagation sequence across the table 12 is established by the frequency of signals applied to the shift register 18 by way of a signal line 19. The shifts on the X pulse signal applied via line 17 through the shift register 18 operate switches in the transistor drive switch bank 16 to separately energize the conductors 14 from the 5-volt source indicated in FIG. 1.

Stylus 20 is of the hand-held, pen or pencil type, having a ball point position-determinant end 22 which is adapted to be placed on the work sheet and, hence, effectively on the work surface 24 of the tablet 21. Stylus 20 carries within the body thereof a pickup coil 26 the turns of which are in a plane which is orthogonal to the longitudinal axis of symmetry of the stylus 20. Thus, when the stylus 20 is in the untilted position of FIG. 2, the plane of the coil 26 is parallel to the plane of the work surface 24. It can be seen that the coil 26 is linked by the flux patterns produced by current flowing through the conductors 14. Changes in the flux linking coil 26 produce voltages which are used to indicate the position of the stylus end 22 within each of the parallel conductor systems. By providing pulse energization of each conductor 14, for example, it is apparent that voltage impulses are induced in the coil 26, the amplitude and polarity of such impulses being a function of (1) the distance between the position-determinant end 22 and the conductor 14 which is energized and (2) the direction from the end 22 to the energized conductor; i.e., assuming a unidirectional energization current flow, the flux pattern to the left of the end 22, as shown in FIG. 2, produces a voltage of one polarity while the flux pattern to the right of the end 22, as shown in FIG. 2, produces a voltage of the opposite polarity.

The output signal voltages from coil 26 of stylus 20 are connected as shown in FIG. 1 through a high-gain amplifier 28 to produce a more usable voltage level to a signal processing unit 30. In the preferred form, unit 30 is an active filter which produces a signal which represents the amplitude envelope of the sequence of impulses produced by the voltage pickup coil 26 in the stylus 20. The output from the signal processing unit 30 is connected to a zero crossing detector 32 which produces an output signal whenever the representative signal from unit 30 passes through a predetermined amplitude condition such as zero amplitude, or some fixed value which represents a threshold or triggering value. The output signal from detector 32 is connected through alternately enabled gates 34 and 36 for application as a strobe signal to the X and Y position storage registers 38 and 40, respectively. As will be hereinafter described in greater detail, the position measuring system 10 provides two coordinate axes X and Y, the measurement operations being carried out in rapid and alternate succession between the two axes in a multiplexed fashion. Accordingly, gates 34 and 36 are alternately enabled during intervals when the X and Y conductors are alternately excited.

Describing now the digital signal generation apparatus, the following signal quantities are of principle importance in understanding the operation of the subject device:

a. Sweep Signal — A periodic signal quantity applied to the input of the shift register associated with the transistor drive switch bank of each axis, each sweep pulse initiating a cycle of conductor excitation for its associated axis.

b. Clock Signal — A periodic signal occuring between sweep signals, the number of clock signals occuring during any sweep signal interval being equal to the number of conductors which are energized.

c. Count Pulse — A high-frequency periodic signal occurring during clock pulse intervals at a rate which is much greater than the clock signal rate so as to produce high position measurement resolution; the number of count pulses having occurred between a sweep signal and a strobe signal being a direct digital indication of the absolute position of the stylus on the tablet.

d. Strobe Signal — The signal generated by the stylus pickup including the coil and associated electronics whenever the impulse wave passes under the stylus end and used as a timing mark to copy the pulse count in reference counter 50 into the data storage register which is active at that time.

In FIG. 1 the source of the sweep, clock, and count pulse signals includes a 6 MHz clock oscillator 42 which may be of the crystal stabilized type. The signal from oscillator 42 is connected to a clock signal generator 44 which produces a 240 KHz clock signal output which is applied to the shift input of the shift register 18 of the X-axis and to the shift register 46 of the Y-axis. A separate switch bank 47 controls the excitation of the Y-axis conductors 48 according to shift times in Y-axis shift register 46. Note that the actual Y-axis conductors are shown only in FIG. 2 to avoid confusion in the drawings. The output of clock oscillator 42 is also connected into a reference counter 50 which produces a 3 KHz output signal. This signal is applied to a count decoder and sweep signal generator unit 52 which generates two 1.5 KHz sweep signals 180° out of phase with each other. Each sweep signal consists of a narrow pulse (4.2 microseconds) synchronized with the reference counter 50. The output line 17 carries the 1.5 KHz X-axis sweep signal to the X-axis shift register 18, and the output line 54 carries the phase shifted 1.5 KHz Y-axis sweep signal to the Y-axis shift register 46. It will be noted that the Y-axis shift register 46 operates in conjunction with a Y-axis transistor drive switch bank 47 which is, for all practical purposes, identical to the X-axis transistor drive switch bank 16. Decoder unit 52 also produces X and Y gating signals on lines 58 and 60, respectively, these signals being applied to the gates 34 and 36 as enabling signals for the X and Y strobe signal outputs, as previously described. Assuming conductors 14 are 80 in number per axis for the sake of illustration, it can be seen that the 3,000 Hz sweep signal rate for each axis and the 240 KHz clock signal rate results in a complete sweep of conductor excitation for each axis in only one half of the sweep period. For the second half of the X-axis sweep period, for example, no X-axis conductors are excited, but rather, the Y-axis sweep takes place. Thus, the X-Y axis multiplexing is carried out such that each axis position measurement function is assigned its own time period.

The reference counter 50 receives count pulses at a much higher rate than the frequency of occurrence of the sweep and clock signals. Accordingly, the count in reference counter 50 changes much more rapidly than the successive energizations of conductors 14. The count in counter 50 is transferred to the appropriate X or Y data storage register only upon the occurence of a strobe signal, such strobe signal acting as a gating function to enable the transfer. The number of count pulses between two adjacent clock pulses is exactly 25 in the present example and, thus, the resolution of the system is one twenty-fifth of the distance between adjacent conductors 14. Since such conductors 14 may be placed very close together, it is apparent that the resolution of the subject system 10 is extremely high; in an actual system, a resolution of 10 mils has been achieved.

The output of the X-axis data storage register 38 is connected to a BCD-to-decimal decoder 62 which drives a display unit 64 having Nixie-type readout tubes, as well known to those skilled in the art. Y-axis storage register 40 drives a BCD-to-decimal decoder 66 which in turn drives the Y-position display or readout unit 68. Although not shown in FIG. 1, it is apparent that the output of the registers 38 and 40 may, through proper interfacing, also be transferred into the memory of a computer unit for automatic storage of the digital position signals which are generated by the system 10.

Looking specifically to FIG. 2, it can be seen that the tablet 12 comprises a flat, planar, two-dimensional support surface 24 which may be made up of an epoxy resin fiberglass material having conductors 14 printed or otherwise bonded to the undersurface thereof. Y-axis conductors 48 are insulatively spaced from the conductors 14 but all of the thicknesses in the assembly of FIG. 2 are so slight as to make both conductors 14 and 48 substantially coplanar with the work surface 24. The entire arrangement is preferably stiffened by means of a proper backing material 70 which is also of a dielectric character so as to produce electrical insulation. The surface 14 is preferably marked with suitable indicia to delineate a usable area within which all position measurements are to be made.

Figure 3:
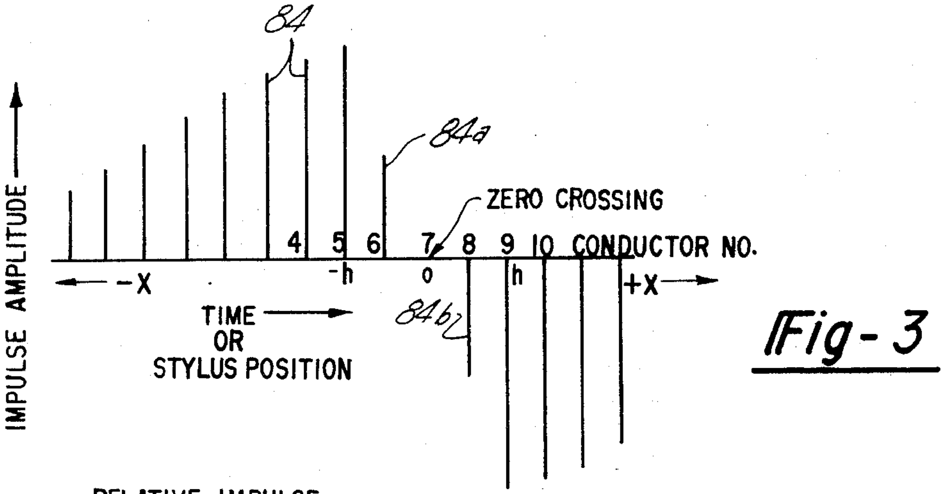
FIG. 3 is a waveform diagram showing the pattern of pickup signal amplitudes and polarities resulting from a pulse-type excitation of the tablet conductors.

FIG. 3 — Impulse Waveform

Looking now to FIG. 3, a sequence of voltage spikes or impulses 84 are shown to have a fixed time distribution along the horizontal axis of FIG. 3. These impulses 84 represent the voltage quantities which are induced in the coil 26 of the stylus 20 as it is held in a fixed position on the tablet 12 during the sweep of the excitation pulse across the conductors 14 of the tablet. Accordingly, pulses 84 occur at the 240 KHz clock rate. Looking to FIGS. 2 and 3 simultaneously, it is shown in FIG. 2 that the end 22 of the stylus 20 is placed directly over X-axis conductor No. 7, this particular conductor being arbitrarily selected for purposes of discussion only. It can be seen that the flux pattern of all conductors to the left of the point 22 in FIG. 2 produce positive impulses voltages in coil 26; the amplitude of the induced voltage being, for all practical purposes, a function of the distance between the end 22 and the excited conductor 14. From mathematical derivation, it can be shown that the amplitude $e$ and polarity of the impulse voltage from each grid wire 14 at a distance $X$ from the stylus end point 22 is represented by the equation:

$$e = -K\ (X \cos \phi / X^2 - 2h\ X \sin \phi + h^2) \qquad (1)$$

Where $$K = (u\ NA/2\pi)\ (di/dt) \qquad (2)$$

$u$ = permeability of the medium (air)
$N$ = number of coil turns
$A$ = area of coil 26
$(di/dt)$ = time rate of change of grid wire current
$\phi$ = angle of stylus axis tilt from vertical in plane perpendicular to wires 14
$h$ = distance along stylus axis between centroid of coil and plane of grid wires.

Figure 4:
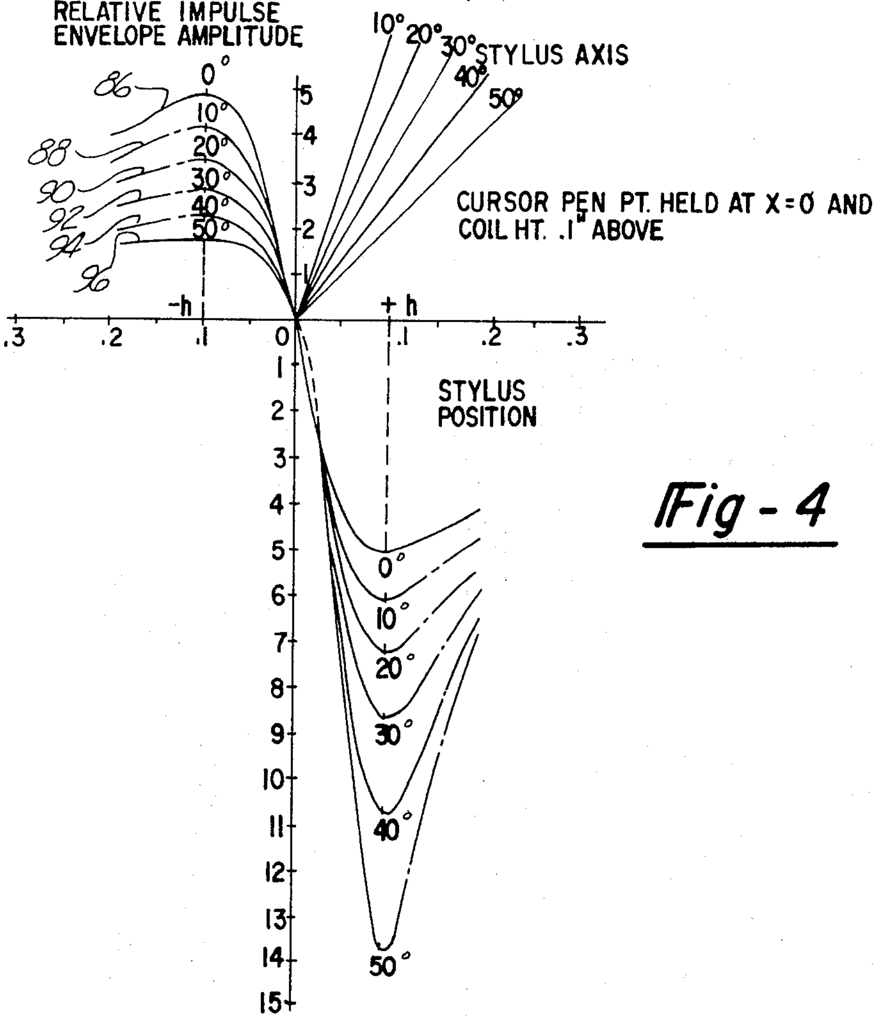
FIG. 4 is a waveform diagram indicating the effect of stylus tilt on the output signal envelope.

Clearly, at $X = 0$, the voltage amplitude $e$ is zero. Accordingly, the amplitude of the induced voltage impulses 84 grows steadily higher as the conductors 14 are energized in sequence until the first conductor located within the distance $h$ of the tip 22 is energized. At this time, the close proximity of that conductor to the coil 26 results in a reduction in amplitude but the impulse 84$a$ is still positive in polarity. Again, it is to be understood that polarity designations "positive" and "negative" are arbitrarily selected, since there is no fixed reference to positive and negative in the system as represented in FIGS. 2 and 4. The excitation of conductor No. 7 in the arrangement of FIG. 2 produces a zero net effect on the coil 26; i.e., there is no signal induced in coil 26 when the conductor immediately under the coil is energized This is because the plane of the coil 26 is tangent to the flux pattern around conductor No. 7 and no flux links the coil. Moreover, it will be immediately apparent that since the flux pattern produced around any given conductor 14 is essentially cylindrical in nature, the tilt or angular relationship between the stylus 20 and conductor No. 7 is of no consequence in flux coupling the coil whatsoever as long as end 22 remains at or very near the center of the cylinder of flux. This is a very significant factor in the insensitivity of the system 10 to stylus tilt, as will be hereinafter described in greater detail with specific reference to FIGS. 4, 5, and 7. Upon energization of conductor No. 8 in FIG. 2, the polarity of the impulse voltages induced in coil 26 goes negative and the amplitude increases for the energization of conductors within *h* of the tip and then falls off as the distance between the energized conductor 14 and the end 22 increases beyond *h*. Note that the timing or pulse interval of the impulses 84 in FIG. 3 is constant and inversely equal to the rate of occurence of the clock signal, as previously described.

Midway between the last positive impulse 84*a* and the first negative impulse 84*b*, there exists a zero amplitude crossing which represents the true passage of the impulse waveform through the point of the end 22 of stylus 20 on the tablet 12 and corresponds to the impulse voltage resulting from conductor No. 7 in the example illustrated in FIG. 2. In accordance with the invention, the 6 MHz count pulses are applied to the counter 50 beginning with the occurrence of the sweep signal so that an increase of 25 counts occurs between each of the 240 KHz clock signals; i.e., between the energization of successive conductors 14. Accordingly, it remains only to sample and transfer the contents of reference counter 50 into register 38 upon the occurrence of the zero amplitude crossing between impulses 84*a* and 84*b* to determine the position of the end point 22 of stylus 20 on the tablet 12 with reference to the X-axis. A similar sampling of reference counter 50 into Y-axis register 40 occurs during the second half of the X–Y multiplex cycle. The specific circuitry for generating the zero crossing signal is indicated as part of blocks 30 and 32 in FIG. 1 and preferred implementations are further described in the copending application ADP 73-4 filed concurrently herewith.

FIG. 4 — Impulse Envelope — Effect of Stylus Tilt

It is to be understood that the excitation signals applied to the conductors 14 are pulses. Thus, the voltage induced in the coil 26 of stylus 20 is an impulse of the type shown at 84 in FIG. 3. As the number of conductors increases for a given tablet and, thus, the spacing between conductors decreases, the impulses amplitudes clearly define an envelope or waveform of the type shown at 86 in FIG. 4; i.e., the 240 KHz clock rate results in impulse intervals of only 4.2 microseconds. This waveform 86 is symmetrical about the zero crossing point whenever the stylus is held in the orthogonal position; i.e., straight up with reference to the surface 24. As the stylus is tilted by angular displacement about the end 22 in a plane orthogonal to the conductors, it is apparent that the plane of the coil 26 simply rotates within the flux pattern cylinder of the conductor that would exist directly under end 22 and at all times remains tangent thereto at the radius determined by the distance between the end 22 and the coil 26. Accordingly, the zero crossing point is substantially unchanged over a large tilt angle, both positive and negative, and, as shown in FIG. 4, the only effect of tilt is to decrease the effective signal amplitude of one polarity while correspondingly increasing the effective signal amplitude of the other polarity. FIG. 4 shows envelopes 88, 90, 92, 94, and 96 for varying degrees of tilt angles in an actual system.

From the description relative to FIGS. 2, 3, and 4, it is apparent that uncompensated insensitivity to stylus tilt requires that the actual distance between the end 22 of stylus 20 and the plane of the grid conductors must be kept very small. The thickness of the finished layer of surface 24 as well as the thickness of the insulative layer betwen conductors 14 and 48 is preferably kept small compared to the desired system accuracy. Should, however, thick tablet materials and constructions be required or should thick work sheets be employed, it is possible to extract tilt angle and direction from the relative shape of the impulse envelopes 88, 90, 92, 94 and, thus, compensate or correct the position reading.

The geometric error $\Delta X$ precipitated from the distance between the stylus point and the plane of the grid wires $Z_{pg}$ is described mathematically by (looking to FIG. 6)

$$\Delta X = Z_{pg} \tan \phi \tag{3}$$

where $\phi$ represents the stylus tilt angle off the vertical. The algebraic sum of the two analog signal amplitude peaks $e_{max}(h, \phi)$ and $e_{max}(-h,\phi)$, which occur at $\pm h(\phi)$ for any $\phi$ yields $$e_{max}(h,\phi) + e_{max}(-h, \phi) = -[K/h(\phi)]\tan \phi \tag{4}$$

where $K$ is a design constant and $h(\phi)$ varies with the tilt angle $\phi$. From the two expressions, it becomes apparent that $$\Delta X = -[Z_{pg}h)/K][e_{max}(h,\phi) + e_{max}(-h,\phi)] \tag{5}$$

Noting from FIG. 4 and the earlier equation of impulse voltage amplitude *e* as a function of distance that the two $e_{max}$ values occur at $\pm h$, it is possible to determine $h(\phi)$ from the analog signal. Knowing $Z_{pg}$ from system design, it is now possible to determine $\Delta X$ from a single sweep of the X-axis coordinate measurement and, thus, compensate for this error.

Equation (5) reveals that the geometric error $\Delta X$ along the X-axis can be determined from the positive and negative envelope peaks. *K* is a constant term defined by the coil design and the grid current drive rate of change with time. The coil height $h(\phi)$ varies with tilt angle, since the stylus is pivoting about a point on the tablet surface which is actually remote from the grid wire plane. However, $h(\phi)$ can be obtained directly from the impulse envelope waveform. The two envelope peaks occur at $\pm h$ ($\phi$). This can be shown mathematically by taking the derivative of equation (1) with respect to $X$, setting it equal to zero and solving for $X$. The quantity $Z_{pg}$ would be constant for a given grid system design. Note that the value of $Z_{pg}$ would also vary if the graphic date to be digitized were on the surface of a thick material, such as glass or cardboard. In such case, the operator could dial in the known thickness of the material allowing the total value of $Z_{pg}$ to be determined.

In a more automated sense, the thickness of the material need not be known. The tablet electronics may be precalibrated to determine $Z_{pg}$. Prior to digitizing on a thick material of unknown thickness, the operator holds the stylus vertical and keys a special button. This allows the system to measure $e_{max}$ ($-h$, 0°) and to compare it to the previously calibrated value without a worksheet. From equation (1) at $X=-h$ $$e_{max}(-h,\phi) = [K \cos\phi/2\ h\ (1 + \sin\phi)] \tag{6}$$

at $\phi = 0°$ $$e_{max}(-h,0°) = [K/2h(0°)] \text{ or } h(0°) = [K/2e_{max}(-h,0°)] \tag{7}$$

From FIG. 6

$$z_{pg} = h(0°) - H \tag{8}$$

where $H\Delta$ distance from coil to stylus point along stylus axis. Thus, the new value of $Z_{pg}$ can be determined from $$Z_{pg} = [K/2\ e_{max}(-h,\ 0°)] - H \tag{9}$$

and may be used in equation (5) to determine $\Delta X$. Note that $H$ would have to be previously known, which would be amenable to a ball point stylus. However, not so for a pencil lead type stylus where the operator could vary lead height. Now, if by design $Z_{pg} >> H$, then $H$ would become insignificant in equations (8) and (9) and thus negligible.

One possible implementation of equation (5) which compensates for tilt error due to tablet thickness is shown in FIG. 5. At the instant the impulse envelope crosses the zero axis, the generated $C_{tr}$ strobe pulse on line 200 samples the reference counter 201 into the intermediate correction counter 202. Meanwhile, the impulse envelope is differentiated at 203 and the first zero-cross detected at 204 to determine when the envelope reaches its maximum positive value $e_{max}$ ($-h$). Ramp generator 205 is started at this time and continues to run until the $C_{tr}$ strobe signal stops it. The ramp has a known slope and provides a timing reference to determine the time, and, hence, distance between the $+e_{max}$ and zero-cross point. The resultant voltage $e$ ($h$) is a measure of the distance $h$ ($\phi$) on the grid. This represents one input into the analog multiplier 206. Along a separate electrical path the impulse envelope out of the low-pass filter 207 feeds both the positive and the negative peak detectors 208 and 209. The resultant constant peak voltages $e_{max}$ ($-h$) and $e_{max}$ ($+h$) are algebraically added together in the summing amplifier 210 whose output becomes the other input to the multiplier 206. Note the amplifier 210 has a manual gain control to input data regarding worksheet thickness where desired. The multiplier 206 may be implemented as an operational transconductance amplifier in which the $e(h)$ signal controls the bias current. The multiplier output, which can be either plus or minus depending upon the two $e_{max}$ values, serves as the reference input for the two comparators 211 and 212 which are used to determine whether the ΔX error is positive or negative in sign; i.e., whether tilt is to the right or left. After the sweep of one grid wire axis has been completed, the positive ramp generator 213 starts. It drives comparator 211 directly and a negative ramp counterpart produced by inverted 214 drives comparator 212. The truth table in FIG. 5a shows the logical states of $E_d$ and $E_u$ that correspond to positive, negative, and zero values of $-[e_{max}(-h)+e_{max}(+h)]$. At the instant both $E_d$ and $E_u$ becomes 1, all inputs to gate 215 are ONE'S and monostable 216 generates a pulse which resets the flip-flop 217, disabling the count up and count down gates 218 and 219, and zeroes the positive and negative peak detectors. However, during the time period between end of sweep and disabling of gates 218 and 219, $E_u$ or $E_d$ allows the 6MHz clock to increment or decrement the count in the correction conter 202. Monostable 220 senses the reset of the flip-flop 217 and strobes the correction counter into the date storage register 222. This count represents in one axis the position of stylus 20 corrected for tilt error due to the finite separation between stylus point and grid plane. If the positive peak of the impulse envelope is smaller than the negative peak, the tilt is that of a normal right-hand operator and the error is positive. Consequently, the correction counter is counted up or ahead. Sweep of the alternate axis commences after sufficient time has been allowed for $\Delta X$ correction.

It is also apparent from FIG. 4 that the generation of a stylus output signal which accurately approximates the impulse envelope requires that a sufficient number of impulses be received on each side of the zero cross point. It is also apparent from FIG. 2 that for stylus positions near the edges of the grid pattern, the number of conductors on one side of the stylus from which to receive flux impulses becomes very small. Thus, it is desirable to make the usable area smaller than the grid pattern so approximately ten or twelve conductors lie outside the usable area borders on all sides. This reduces signal deformation known as "edge effect" and contributes to overall system accuracy.

It is to be understood that the foregoing description is made with reference to illustrative embodiments of the invention and is not to be construed in a limiting sense as various modifications in circuitry and physical design may be apparent to those skilled in the art.

The embodiments of the invention in which an exclusive property or privilege is claimed are defined as follows:

1. In a system for producing digital data representing the position of a stylus relative to a two-dimensional surface for receiving a work sheet, a plurality of closely spaced, parallel and coplanar conductors disposed parallel to said surface and spaced a distance $Z_{pg}$ therefrom, means for energizing the conductors in sequence with a unidirectional current pulse thereby to produce a flux wave which travels across the surface in a direction perpendicular to the conductors, a stylus having an end point freely positionable over the surface, pickup means carried by the stylus and responsive to flux produced by the energization of the conductors to produce an output representing the passage of the wave past the end point of the stylus on the surface, means responsive to the output to produce a signal quantity representing the position of the end point along an axis parallel to the direction of said flux wave, and means for compensating said signal quantity for the apparent position difference between the actual end position of the stylus along said axis and the projected end point in the plane of the conductors taken along the axis of the stylus.

2. Apparatus as defined in claim 1 wherein the means for producing the signal quantity includes a digital count signal source, a register for receiving the signals, means for starting the count at the beginning of the conductor energization sequence and means for stopping the count on occurrence of said output signal.

3. Apparatus as defined in claim 2 wherein said pickup means includes a coil mounted in the stylus perpendicular to the longitudinal axis thereof thereby to generate an impulse voltage the envelope of which passes from a positive peak upon energization of the first conductor within a distance $h(\phi)$ from the projection of the end point in the conductor plane on one side of the end point to a negative peak upon energization of the last conductor within a distance $h(\phi)$ on the other side of the end point where $h(\phi)$ is coil height from the plane of the conductors along the stylus and output means connected to the coil for producing the output signal at a predetermined signal value between the positive and negative peaks.

4. Apparatus as defined in claim 3 including as part of said means for compensating a correction counter connected between the count signal source and the register, and logic means for counting the counter so as to compensate for the apparent position difference.

5. Apparatus as defined in claim 4 including means for detecting the positive and negative peaks, means for determining $h$ as a function of the time between the peaks, means for determining which of the peaks has the greater absolute value, and means for determining the position difference as a function of $h$.

* * * * *